W. J. FOSTER.
DYNAMO ELECTRIC MACHINE.
APPLICATION FILED JAN. 24, 1910.

1,022,023.

Patented Apr. 2, 1912.

WITNESSES:
Lester H. Fulmer.
J. Ellis Glen.

INVENTOR.
WILLIAM J. FOSTER.
BY
HIS ATTORNEY.

UNITED STATES PATENT OFFICE.

WILLIAM J. FOSTER, OF SCHENECTADY, NEW YORK, ASSIGNOR TO GENERAL ELECTRIC COMPANY, A CORPORATION OF NEW YORK.

DYNAMO-ELECTRIC MACHINE.

1,022,023.   Specification of Letters Patent.   Patented Apr. 2, 1912.

Application filed January 24, 1910. Serial No. 539,642.

*To all whom it may concern:*

Be it known that I, WILLIAM J. FOSTER, a citizen of the United States, residing at Schenectady, county of Schenectady, State of New York, have invented certain new and useful Improvements in Dynamo-Electric Machines, of which the following is a specification.

My invention relates to dynamo electric machines and is particularly applicable to the rotors of such machines.

It has for its object an efficient arrangement for ventilating such rotors.

Heretofore in ventilating the rotor of a dynamo electric machine which revolves at high speed, air has been introduced at the heads of the rotor. This causes windage losses and also affects the design of the entire machine. For example, in thus ventilating such a rotor, which is usually long (axially), it is necessary to have large axial channels in the core thereof as near the axis of revolution as possible to admit sufficient air to carry away the heat losses. The presence of these axial channels requires the diameter of the entire machine to be increased in order to provide the necessary cross-section of magnetic material in the rotor. By my invention these high windage losses are avoided and a more economical design is possible in which the diameter of the rotor and consequently that of the entire machine is reduced. To this end, I provide the rotor with ventilating spaces having channels formed therein, each of which extends from one portion of the periphery of the rotor to another portion of said periphery and is arranged so that the forces tending to throw the air out of said rotor will be different at the two ends of the channel.

Other features of novelty which characterize my invention are pointed out with particularity in the claims annexed to and forming a part of this specification.

For a better understanding of my invention, reference may be had to the following description taken in connection with the accompanying drawing, in which—

Figure 1:
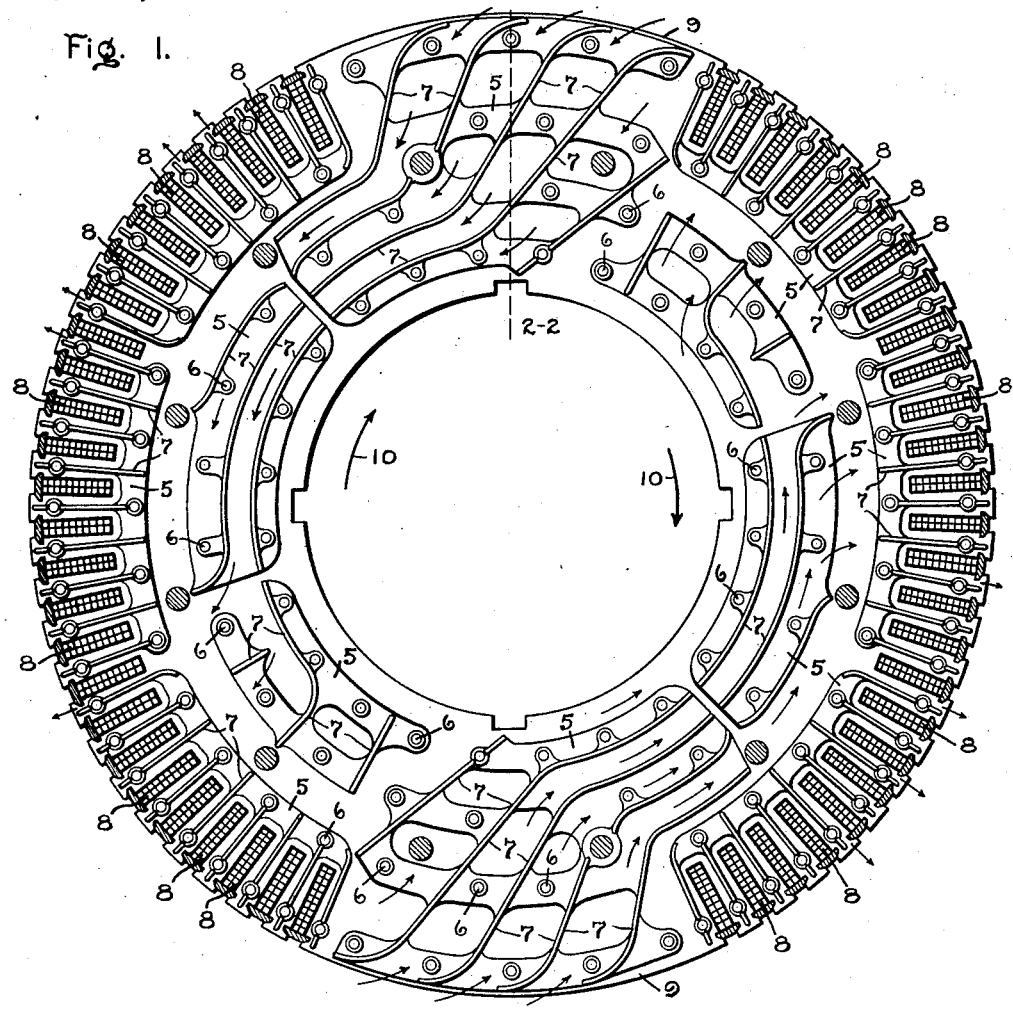
Figure 2:
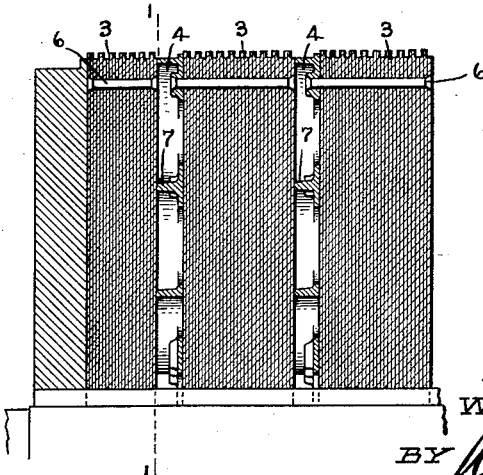

Figure 1 is a cross-sectional view of a rotor embodying my invention and taken on the line 1—1 of Fig. 2; and Fig. 2 is a sectional view of Fig. 1 taken on the line 2—2.

Referring to the drawing, the rotor of the dynamo electric machine is built up of laminations 3 which are arranged in bundles, separated by ventilating spaces 4. Space blocks 5 are fastened to the laminations by rivets 6, and the ribs 7 on the space blocks form channels in the ventilating spaces. Each of the channels extends from one portion of the periphery of the rotor to another portion thereof, and is arranged so that when the rotor revolves the forces tending to throw the air out of the rotor will be different at the two ends of the channel, that is, the ends of the channel make different angles with the radial lines, as will be hereafter explained. The rotor core is provided with slots over a portion of its periphery in which windings 8 are distributed. The portions 9 of the periphery of the rotor, which are between the winding portions, form the polar portions and in the particular arrangement of the drawing a bipolar rotor is shown. The rotor may have any number of polar portions, however. In the polar portions, the space blocks 5 are arranged so that each of the channels is inclined to a radius of the rotor, while in the winding portions, the space blocks are arranged so that each of the channels extends at a different angle with respect to a radial line than the other end thereof, and I have preferred to extend it radially. The movement of the air in the channels, when the rotor revolves, is analogous to the performance of a siphon as related to the force of gravity. It is well known that different pressures are produced by fans by inclining the blades at different angles with respect to the radial lines. In a smooth core rotor of a dynamo electric machine, as shown in the drawing, the coils together with the ribs on the space blocks in the winding spaces act as radial fan blades. By arranging the ribs on the space blocks in the polar portions inclined at an angle to the radial lines, different pressures will be produced at the two ends of each channel, so that with a direction of rotation as indicated by the arrows 10, the air will flow through the channels as indicated by the arrows, that is, from the air gap through the part of the channels located in the polar portions, then through the part of the channels below the windings, and out of the spaces between the windings. If the rotor is revolved in a direction opposite to that of the arrows 10, the flow of air will be in the opposite direction to that explained above.

I desire it to be understood that my invention is not limited to the particular construction shown and described, and I aim in the appended claims to cover all modifications which do not depart from the spirit and scope of my invention.

What I claim as new and desire to secure by Letters Patent of the United States, is,—

1. In a dynamo electric machine, a rotor provided with ventilating spaces, space blocks in the ventilating spaces having ribs which form channels in said spaces, each of said channels extending from one portion of the periphery of said rotor to another portion of said periphery and making at the two ends thereof different angles with radial lines so that the forces tending to throw the air out of said rotor will be different at the two ends of said channel.

2. In a dynamo electric machine, a rotor provided with ventilating spaces, space blocks in the ventilating spaces having ribs which form channels in said spaces, each of said channels making at the two ends thereof different angles with radial lines.

3. In a dynamo electric machine, a rotor provided with ventilating spaces, space blocks in the ventilating spaces having ribs which form channels in said spaces, each of said channels being inclined at one end to a radius and extending radially at the other end.

4. In a dynamo electric machine, a rotor provided with ventilating spaces, space blocks in the ventilating spaces having ribs which form channels in said spaces, each of said channels extending from one portion of the periphery of the rotor to another portion of said periphery and making at the two ends thereof different angles with radial lines.

5. In a dynamo electric machine, a rotor provided with ventilating spaces, space blocks in the ventilating spaces having ribs which form channels in said spaces, each of said channels extending from one portion of the periphery of the rotor to another portion of said periphery, and being inclined at one end to a radius and extending radially at the other end.

6. In a dynamo electric machine, a rotor provided with ventilating spaces, a winding distributed in slots over a portion of the periphery of said rotor so as to form polar portions between the windings, space blocks in said ventilating spaces having ribs which form channels in said spaces, each of said channels extending from the periphery of the rotor at a polar portion to said periphery at a winding portion and making at the two ends thereof different angles with radial lines so that the forces tending to throw the air out of said rotor will be different at the two ends of each channel.

7. In a dynamo electric machine, a rotor provided with ventilating spaces, a winding distributed in slots over a portion of the periphery of said rotor so as to form polar portions between the windings, space blocks in the ventilating spaces having ribs which form channels in said spaces, each of said channels making at the two ends thereof different angles with radial lines.

8. In a dynamo electric machine, a rotor provided with ventilating spaces, a winding distributed in slots over a portion of the periphery of said rotor so as to form polar portions between the windings, space blocks in the ventilating spaces having ribs which form channels in said spaces, each of said channels extending from the periphery of the rotor at a polar portion to said periphery at a winding portion and making at the two ends thereof different angles with radial lines.

9. In a dynamo electric machine, a rotor provided with ventilating spaces, a winding distributed in slots over a portion of the periphery of said rotor so as to form polar portions between the windings, space blocks in the ventilating spaces having ribs which form channels in said spaces, each of said channels extending from the periphery of the rotor at a polar portion to said periphery at a winding portion and being inclined at an angle to a radius of the rotor in the polar portion and extending radially in said winding portion.

10. In a dynamo electric machine, a rotor provided with ventilating spaces, a winding distributed in slots over a portion of the periphery of said rotor so as to form polar portions between the windings, space blocks in the ventilating spaces having ribs which form channels in said spaces, each of said channels being inclined at an angle to a radius of said rotor in a polar portion and extending radially in a winding portion of said rotor.

In witness whereof, I have hereunto set my hand this 20th day of January, 1910.

WILLIAM J. FOSTER.

Witnesses:
BENJAMIN B. HULL,
HELEN ORFORD.

Copies of this patent may be obtained for five cents each, by addressing the "Commissioner of Patents, Washington, D. C."